United States Patent [19]

Mouille et al.

[11] Patent Number: 4,458,862
[45] Date of Patent: Jul. 10, 1984

[54] ANTIRESONANT SUSPENSION DEVICE FOR HELICOPTER

[75] Inventors: René L. Mouille, Aix-en-Provence; Gérard C. L. Genoux, Gardanne; Pierre E. Hege, Aix-en-Provence, all of France

[73] Assignee: Societe Nationale Industrielle et Aerospatiale, Paris, France

[21] Appl. No.: 470,704

[22] Filed: Feb. 28, 1983

Related U.S. Application Data

[63] Continuation of Ser. No. 229,749, Jan. 29, 1981, abandoned.

[30] Foreign Application Priority Data

Feb. 5, 1980 [FR] France .............................. 80 02505

[51] Int. Cl.³ .............................................. B64C 27/06
[52] U.S. Cl. ................................. 244/17.27; 188/379; 248/557; 248/559; 416/500
[58] Field of Search ........................... 244/17.25, 17.27; 416/145, 500; 248/554, 556, 557, 559; 188/378, 188/379, 380

[56] References Cited

U.S. PATENT DOCUMENTS

| | | | |
|---|---|---|---|
| 1,973,510 | 9/1934 | Schieferstein | 248/559 |
| 3,502,290 | 3/1970 | Legrand et al. | 244/17.27 X |
| 3,972,491 | 8/1976 | Ferris et al. | 244/17.27 |
| 4,088,042 | 5/1978 | Desjardins | 188/379 X |

OTHER PUBLICATIONS

"Advanced Development of a Helicopter Rotor Isolation System for Improved Reliability", vol. 1, Summary Report, Kaman Aerospace Corp., Bloomfield, Conn. 06002, 12-1977, pp. 17-21.

Primary Examiner—Sherman D. Basinger
Attorney, Agent, or Firm—Murray Schaffer

[57] ABSTRACT

The invention relates to aeronautics in general, and in particular to a suspension device for helicopter, comprising a flexible mounting plate at the center of which is fixed the bottom of the main gear box whose top is supported by hinged oblique bars. The mounting plate offers radial arms hinged to the base of the bars and to the fuselage of the helicopter. These arms bear flapping weights creating forces of inertia with reactions at the attachment points of direction opposite the elastic reactions of deformation of the mounting plate. A device of this type enables the vibrations on board helicopters to be reduced.

12 Claims, 13 Drawing Figures

ANTIRESONANT SUSPENSION DEVICE FOR HELICOPTER

This is a continuation of Ser. No. 229,749 filed Jan. 29, 1981 now abandoned.

BACKGROUND OF THE INVENTION

In mechanical-drive helicopters, the lifting rotor is connected via a vertical transmission shaft to a speed reduction gear ensuring the transmission of power from the propulsion engine or engines of the apparatus. The assembly of the rotor-shaft-reduction gear constitutes, with respect to the structure of the helicopter, a relatively rigid assembly.

The speed reduction gear constitutes the main gear box and the case of each box is generally fixed on the structure of the helicopter by two types of link. The first link comprises a certain number of rigid elements, such as bars or stiffeners, in a number at least equal to three, interposed obliquely between the upper part of said case and strong points of the structure of the fuselage. The second link is a direct link between the lower part of this case and said structure; it is intended to take up the countertorque of the rotor, totally or partially. On the other hand, the functioning of said rotor for lifting and propelling the helicopter produces a vibration excitation essentially in the plane of said rotor. To attenuate its transmission to the fuselage, there may be disposed between the lower part of the case of the gear box and the fuselage, elements flexible in translation in a plane parallel to that of the rotor, but having considerable ridigity in rotation about its axis so as to be in a position to transmit the countertorque of the rotor.

U.S. Pat. No. 3,502,290 describes such an elastic link. It is formed by a flexible mounting plate constituted by a plate in which certain zones have cut-out portions, in the manner of a grid comprising bars. The flexibility thus obtained allows filtering of the vibrations by elastic deformation of the mounting plate at least in a direction thus privileged.

Other arrangements of suspension plate between the lower part of the main gear box and the top of the fuselage are described in U.S. Pat. No. 3,920,202 and in U.S. patent application Ser. No. 21,778 of Mar. 19, 1979 now U.S. Pat. No. 4,274,510. These mounting plates make it possible both to obtain, in their plane, a flexibility in mono- or multidirectional translation and to transmit the torque induced by the gear box on the fuselage.

All these devices ensure a relatively effective filtering of the vibrations produced by the rotor. However, on modern fast helicopters, the desired improvement in comfort imposes a search for a still lower vibration level. The corresponding attenuation of the vibrations may be obtained by means complementary of the preceding systems. For example, resonator devices employing blades or springs placed at different points of the helicopter fuselage and possibly on the flight controls may be used. These resonators oscillate at their own frequency, with such amplitude and phase that they absorb, at least partially, the alternate efforts transmitted by their points of fixation. These devices present, however, major drawbacks. On the one hand, such resonators must be disposed at each of the points where vibrations must be attenuated; this results in a considerable weight excess. On the other hand, the effect of attenuating the vibrations, obtained with each resonator, is limited to the vicinity of its point of fixation. Finally, the positioning of a resonator at a determined point may have for effect to amplify the vibrations at other points of the apparatus.

To overcome these drawbacks, resonators have been made, disposed above the hub of the rotor, from which they receive their excitation directly. These resonators may be constituted by a flapping weight, returned into neutral position by antagonistic springs. Such resonators are for example the subject matter of U.S. application Ser. No. 9614, now U.S. Pat No. 4,255,084, and No. 9578, now U.S. Pat. No. 4,281,967 of Feb. 5, 1979. These resonators offer the advantage of opposing the vibrations as near as possible to their source, i.e. on the rotor hub itself. They are all the more efficient as they are used in complement to the devices for suspension of the lower part of the main gear box, such as those described in U.S. Pat. Nos. 3,502,290 and 3,920,202.

However, such antivibration devices (hub resonators and elastic links between gear box and fuselage), although they generally enable a very good vibration level to be obtained on helicopters having more than two blades on the main rotor, present the drawback of a relatively considerable weight and also of a high cost price.

SUMMARY OF THE INVENTION

The present antiresonant suspension device remedies these drawbacks. It combines an elastic link between the lower part of the main gear box and the fuselage and flapping weights which are directly associated therewith, simply and in a compact assembly. This device is efficient in combatting the vibrations from the rotor not only for the longitudinal and transverse excitations, but also for the so-called vertical pumping excitations.

To this end, the present invention relates to an antiresonant suspension device for helicopter composed of a fuselage, a propulsion assembly, a rotor and a gear box located between said propulsion assembly and said rotor and aligned on the axis of the latter, this device comprising a set of at least three oblique connecting bars and a mounting plate for suspension of the gear box on the fuselage structure. According to the invention, the mounting plate comprises a central part fast with the bottom of the gear box and radial extensions in a number equal to the number of said oblique bars, forming coplanar arms disposed in star form around said central part, which are substantially rigid in their plane but flexible in a direction perpendicular thereto, each of these arms being connected, in the region of its end, on the one hand to the fuselage at a strong point thereof, on the other hand to the lower end of the corresponding connecting bar, by respective joints allowing it displacements by deformation in a direction perpendicular to its plane, and the end of each flexible arm being fast with a relatively rigid lever bearing, at its free end, a flapping weight.

In one embodiment, the joint by which each flexible arm is connected to the fuselage is a bearing joint whose axis is contained in the plane of the mounting plate and perpendicular to the longitudinal direction of said arm and to the axis of rotation of the rotor, whilst the joint by which each flexible arm is connected to the lower end of the corresponding connecting arm is preferably a ball joint. In another embodiment, the joint by which each flexible arm is connected to the fuselage is a ball joint, whilst the joint by which each flexible arm is connected to the lower end of the corresponding connecting arm is preferably a bearing whose axis is contained in the plane of the mounting plate and perpendicular to the direction of said arm and to the axis or rotation of the rotor, said bearing advantageously being constituted by ball or roller bearings in order to reduce damping by friction.

The flexible arms advantageously have a width which decreases from the central part of the mounting plate towards their end, and preferably comprise an inner opening extending along their longitudinal axis.

In one embodiment of the device according to the invention, the lever bearing the flapping weight of each flexible arm is constituted by an extension of said arm directed outwardly, the flapping weight being located beyond the joint on the fuselage with respect to the centre of the mounting plate.

In another embodiment, the lever supporting the flapping weight mentioned above is constituted by an extension of the flexible arm directed inwardly, the flapping weight then being located in the opening in said arm, between the joint on the fuselage and the centre of the mounting plate.

The joint connecting each flexible arm to the fuselage is in principle located between the flapping weight and the joint connecting said arm to the corresponding connecting bar. The joint connecting each flexible arm to the corresponding connecting bar may also be provided to be located between the flapping weight and the joint connecting said arm to the fuselage.

The lever bearing each flapping weight may be integral with the corresponding flexible arm. It may also be connected thereto.

BRIEF DESCRIPTION OF THE DRAWINGS

The invention will be more readily understood on reading the following description with reference to the accompanying drawings, in which.

DESCRIPTION OF THE INVENTION

Figure 1:
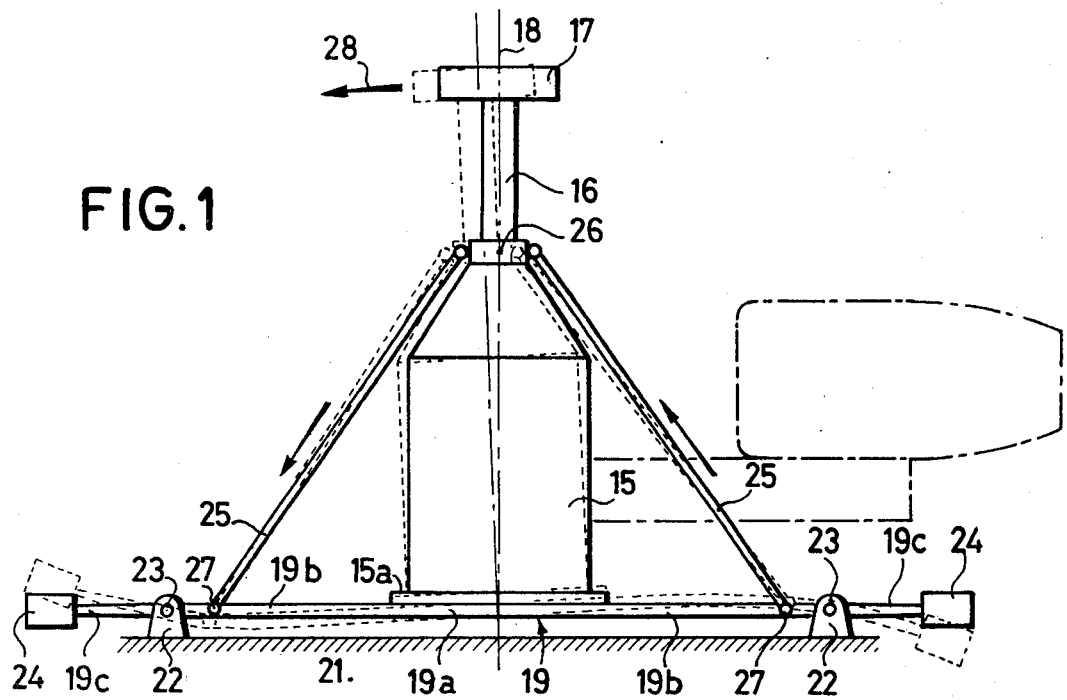
FIGS. 1 and 2 schematically show, in elevation and in plan view respectively, a suspension device according to the invention in a first embodiment.

Referring now to the drawings, FIG. 1 shows the main gear box 15 of a helicopter, interposed between a propulsion assembly shown in dot-dash outline and the shaft 16 of the rotor of which only the hub 17 has been shown. Elements 15, 16 and 17 are aligned on the axis or rotation 18 of the rotor.

Figure 2:
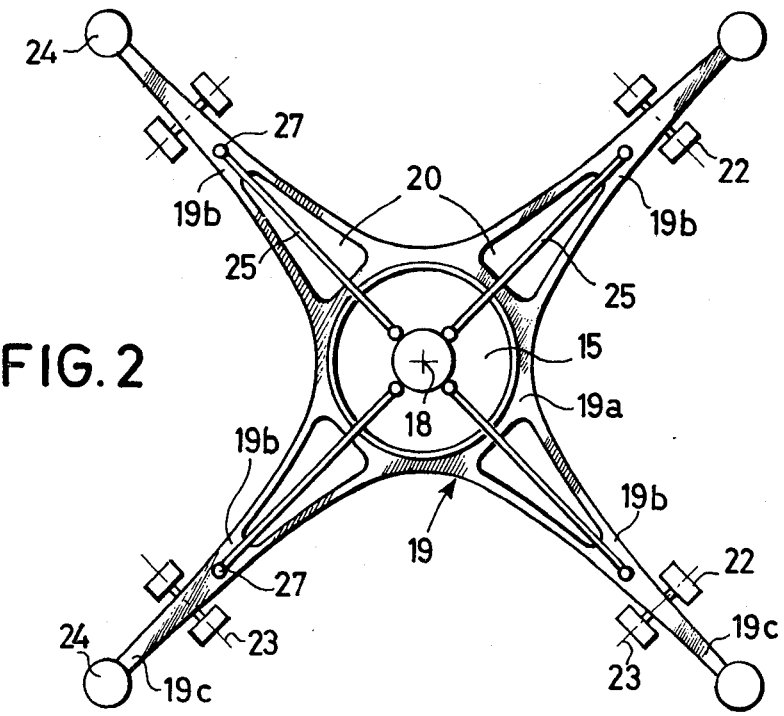

The bottom 15a of the case of the gear box 15 is fixed by a ring of volts to the central part 19a of a flat, flexible mounting plate 19, of which the plane is perpendicular to the axis 18 and which comprises radially extending, four in number in the present example, flexible arms 19b distributed regularly in star form around the central part 19a, with which they are integral (FIG. 2). The width of these arms 19b decreases from the central part 19a to their outer end and they have an inner longitudinal opening 20 of substantially triangular form.

The flexible arms 19b abut, in the region of their outer ends, on strong points of the upper part of the fuselage 21 of the helicopter, via bearings 22 of which the pivot pins 23 are contained in the plane of the mounting plate 19 and are perpendicular to the radial direction of the respective arms, as well as to the axis 18. These bearings 22 are constituted so that they present virtually no damping nor friction and that, on the one hand, they may transmit to the fuselage the shearing stresses and the bending moments of which the arms 19b are the seat in their plane, whilst, on the other hand, they allow said arms slight angular displacements by their ends pivoting about pivot pins 23, as shown in dashed lines in FIG. 1.

Each flexible arm 19b extends beyond the bearing 22 by a more rigid terminal part 19c forming a lever, which bears at its end a flapping weight 24, the assembly 19c, 24 forming an antiresonant system acting by inertia.

The main gear box 15 is also connected to the structure of the fuselage 21—indirectly—by means of a set of oblique bars 25. These are substantially concurrent at their top ends at a focusing point 26 located at the top of the gear box 15, on axis 18, and they are connected at their lower ends, via a ball joint 27, each to a corresponding flexible arm 19b, at a point thereon near the bearing 22 and nearer the axis 18 than said bearing.

In the present example, the oblique bars 25 are four in number, like the flexible arms 19b. More generally, it will be considered that the number of flexible arms of the mounting plate 19 is always equal to the number of oblique bars 25, this number never being less than three.

The reaction of the drive torque of the rotor passes entirely from the bottom 15a of the gear box 15 into the fuselage 21 via the arms 19b of the flexible mounting plate 19, which work in flexion in their plane. The horizontal shearing stresses produced in the plane of the rotor and transmitted by the shaft 16 and the gear box 15 are taken up on the structure of the fuselage by the flexible arms 19b working in their plane in traction or in longitudinal compression. These stresses do not substantially deform the arms 19b. On the contrary, the moments 28 of horizontal axis in the plane of the rotor and the moments due to the above-mentioned shearing stresses are also transmitted to the structure 21 by the arms 19b, but with attenuation, as they inflict thereon bending deformations in a direction parallel to the axis 18, as indicated in dashed lines in FIG. 1.

The vertical lifting efforts of the rotor as well as the horizontal bearing reactions due to the efforts in the plane of the rotor and located at the level of the upper attachment of the oblique bars 25 load said bars longitudinally and are transmitted to the structure of the fuselage 21 via joints 27 and 22.

Due to the geometry of the assembly, it is seen that the dissymetrical efforts in the plane of the rotor provoke on each arm 19b, between the lower joint 27 of the bar 25 and the adjacent bearing 22, a moment which accentuates the deformation of the arm caused by the bending stress applied correlatively by the bottom 15a of the gear box 15. Thus, the longitudinal and lateral dynamic efforts and moments (with respect to the direction of flight of the helicopter) produced in the plane of the rotor with frequency b Ω (b being the number of blades of the rotor and Ω its speed of rotation), which the present device is essentially to attenuate, as well as the dynamic vertical "pumping" efforts, are filtered because the elastic reactions at the points of attachment 22 on fuselage corresponding to the deformations of the flexible arms of the mounting plate are counterbalanced by the forces of inertia developed by the flapping weights and which give said points of attachment reactions of direction opposite the direction of the above-mentioned reactions. This effect completes the filtering action of the flexible mounting plate 19.

Figure 3:
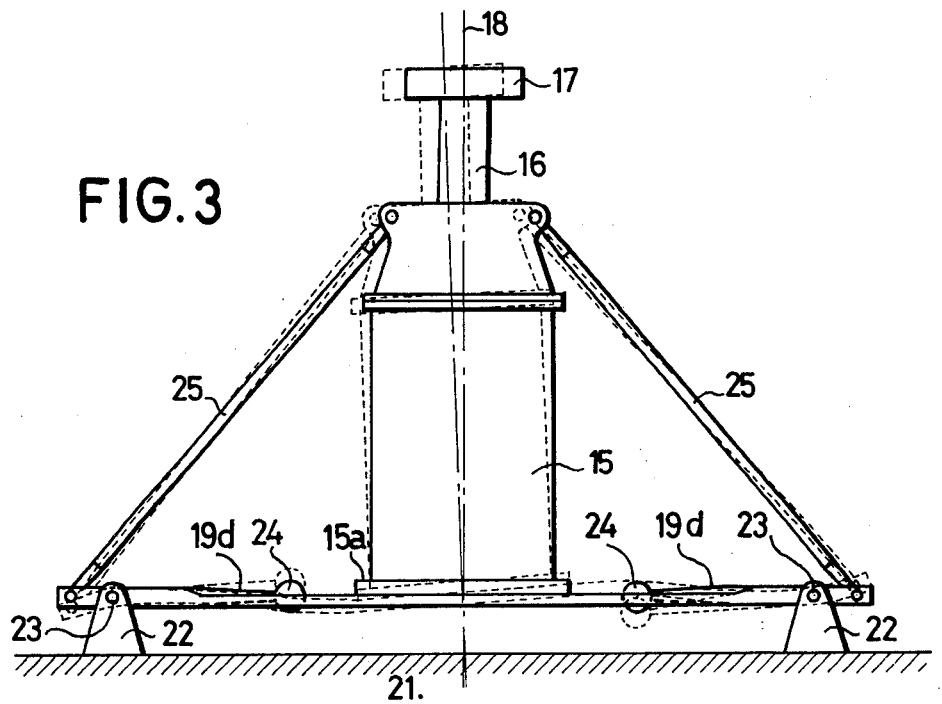
FIGS. 3 and 4 similarly show a device according to the invention in a second embodiment.
Figure 4:
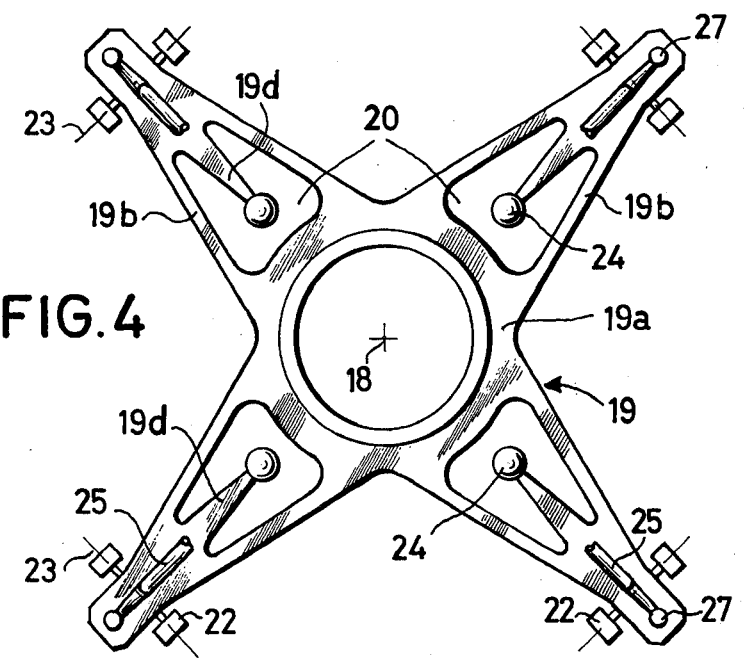

In the variant embodiment shown in FIGS. 3 and 4, elements homologous to those of FIGS. 1 and 2 bear the same references. The only differences reside in that the outer extensions 19c of the arms 19b are replaced by inner extensions 19d, i.e. directed towards the central axis 18, the weights 24 flapping through the openings 20 in the arms 19b, and that the ball joints 27 of the connecting bars 25 are located beyond the bearing joints 22, i.e. further from axis 18 than said bearin joints. Such an assembly, which is more compact than that of FIGS. 1 and 2, functions in the same manner.

Figure 5:
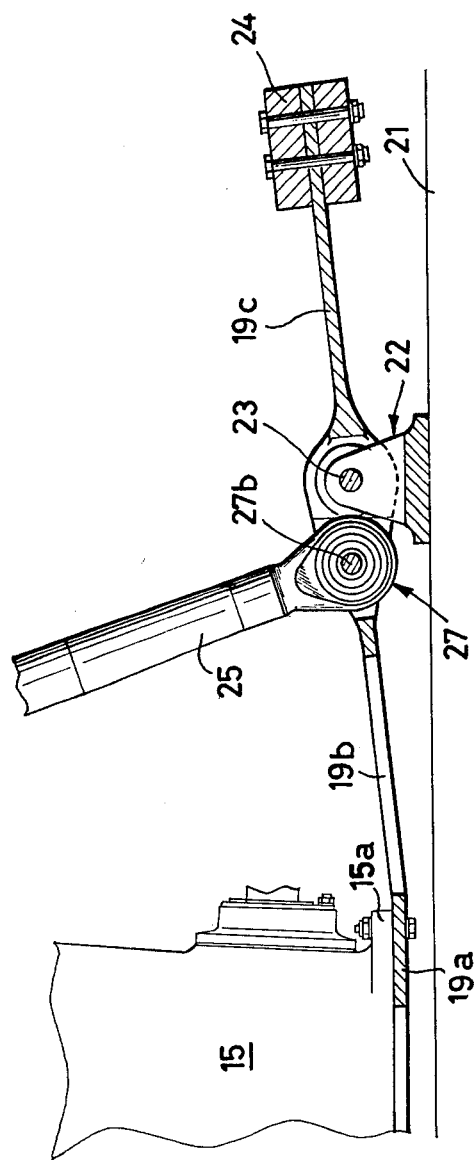
FIGS. 5 and 6 show in detail, on a larger scale, an embodiment of one of the flexible arms as shown respectively in FIGS. 1 and 2.
Figure 6:
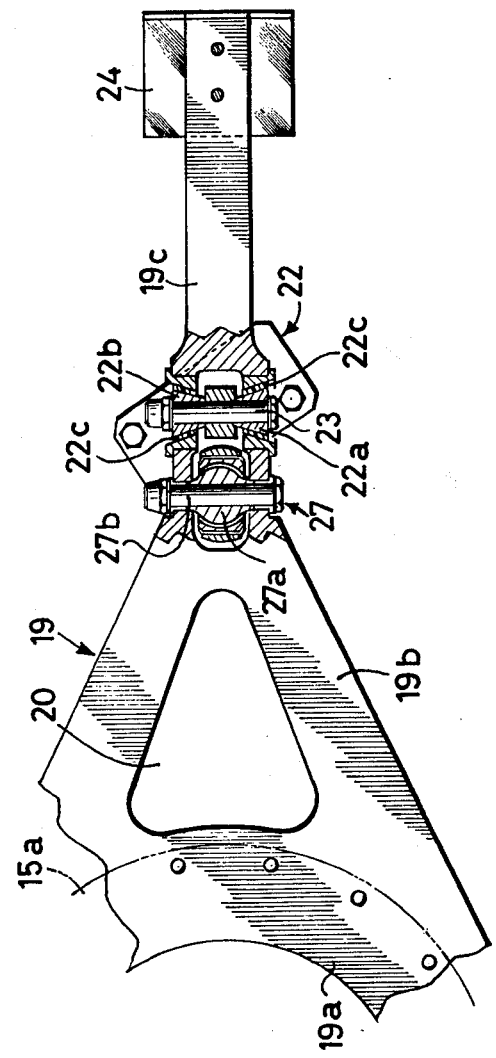
Figure 7:
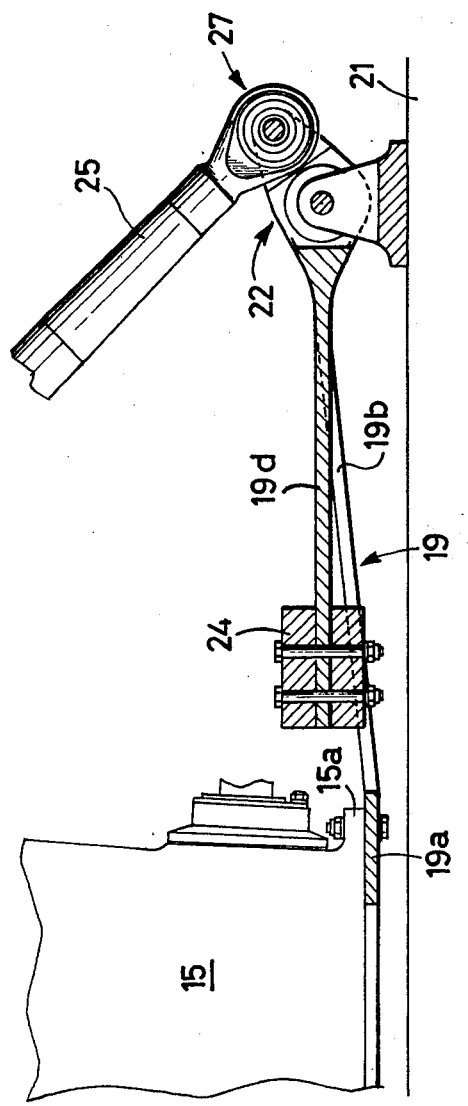
FIGS. 7 and 8 similarly show an embodiment of one of the the flexible arms as shown respectively in FIGS. 3 and 4.
Figure 8:
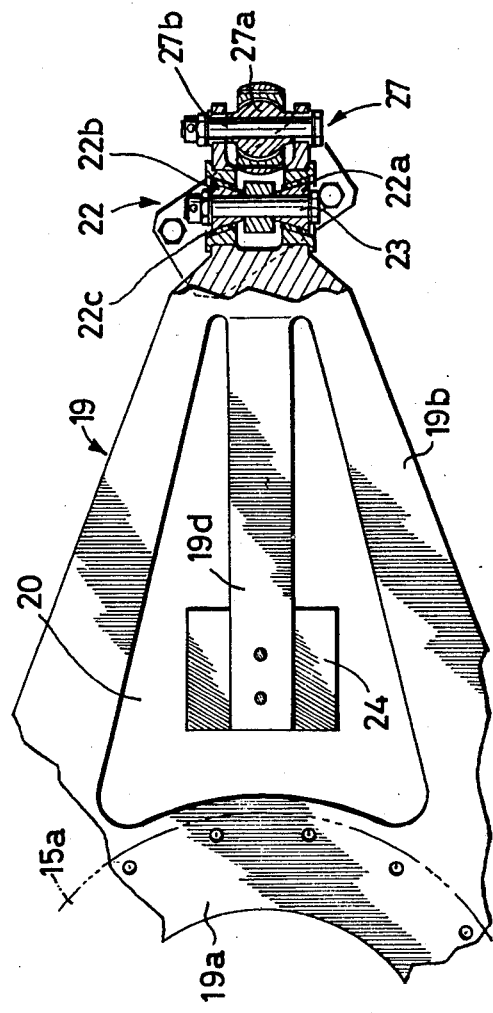

FIGS. 5 and 6 show a practical embodiment of the device of FIGS. 1 and 2, and FIGS. 7 and 8 a practical embodiment of the device of FIGS. 3 and 4. In the devices thus produced, the central base plate 19a of the flexible mounting plate 19, its flexible arms 19b, the extensions 19c or 19d thereof and the supports of the ball joints 27 and bearing joints 22, are constituted by a monobloc piece of forged metal. The lower ends of the oblique bars 25 are respectively attached to the mounting plate 19 by a self-lubricating ball joint 27a through which a pin 27b passes. In the bearing joints 22, the pin 23 abuts on a double conical bearing 22a, b with interposition of an elastomer layer 22c, so as to allow the slight angular displacements desired, with negligible friction.

Figure 9:
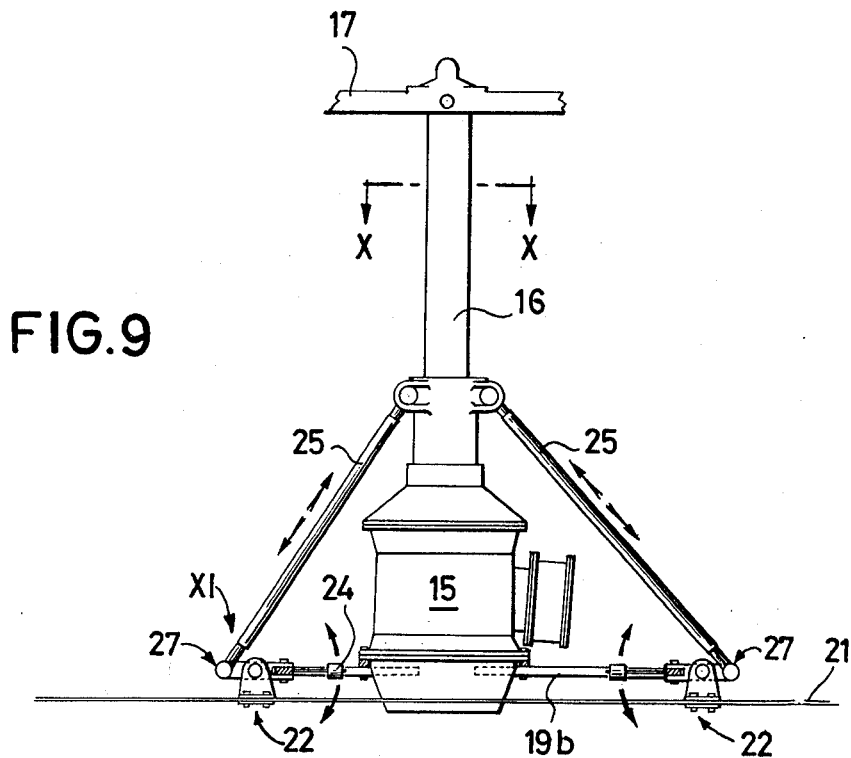
FIGS. 9 and 10 shows, in elevation and in plan view, respectively, a practical embodiment of a device according to the invention.
Figure 10:
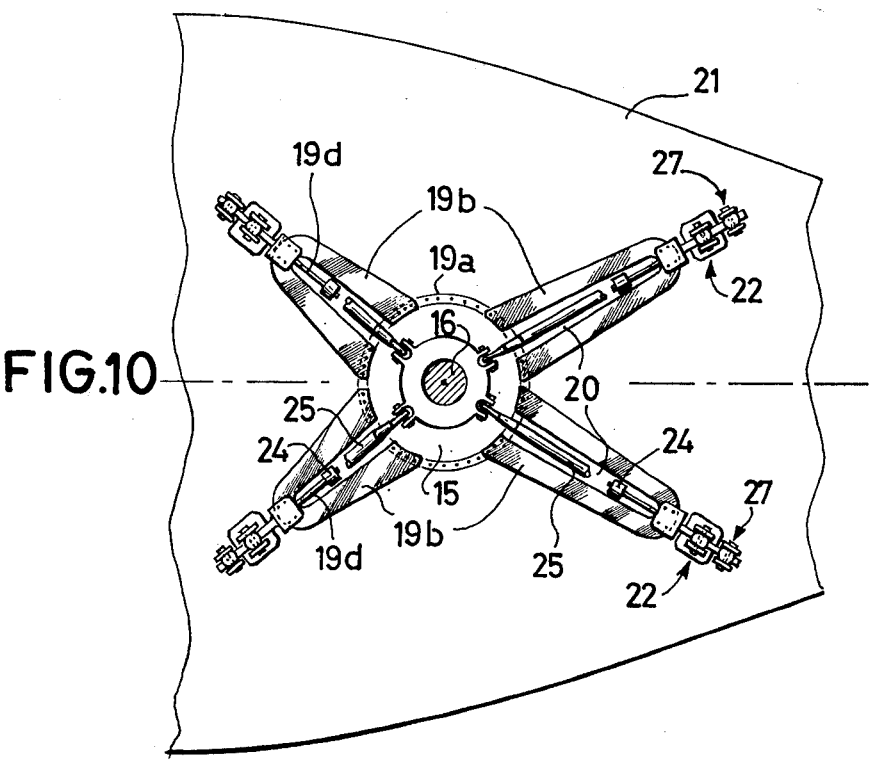
Figure 11:
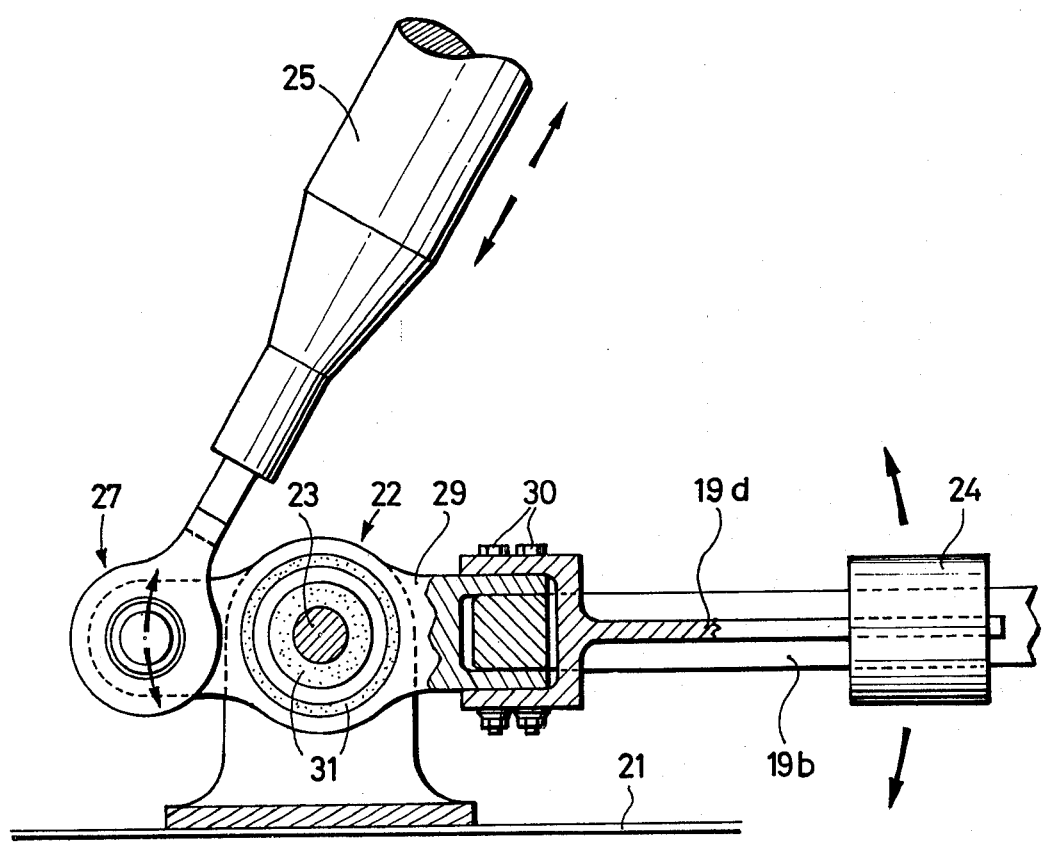
FIG. 11 shows, on a larger scale, the detail XI of FIG. 9.

FIGS. 9, 10 and 11 show a practical embodiment of the device of FIGS. 3 and 4. Here, the flexible arms 19b are composed of metal blades bolted on a central base 19a fixed to the bottom of the case of the main gear box 15. The longitudinal openings 20 in these blades make it possible to house the flapping weights 24 mounted at the ends of flexible blades 19d added on the arms 19b, via a piece 29 forming the end of each of the arms 19b, by means of bolts 30 passing through the whole. Each piece 29 comprises the bearing joint 22 for connection to the fuselage 21, here constituted by a laminated sleeve joint comprising two elastomer layers 31 around axis 23, and the ball joint 27 for connection to the corresponding oblique bar. In this embodiment, the flexible arms 19b are made of metal and, for example, cut out from a thick metal sheet. In a preferred embodiment, they may also be made of a laminated material made of high-resistance fibres embedded in a thermohardened synthetic resin.

Figure 12:
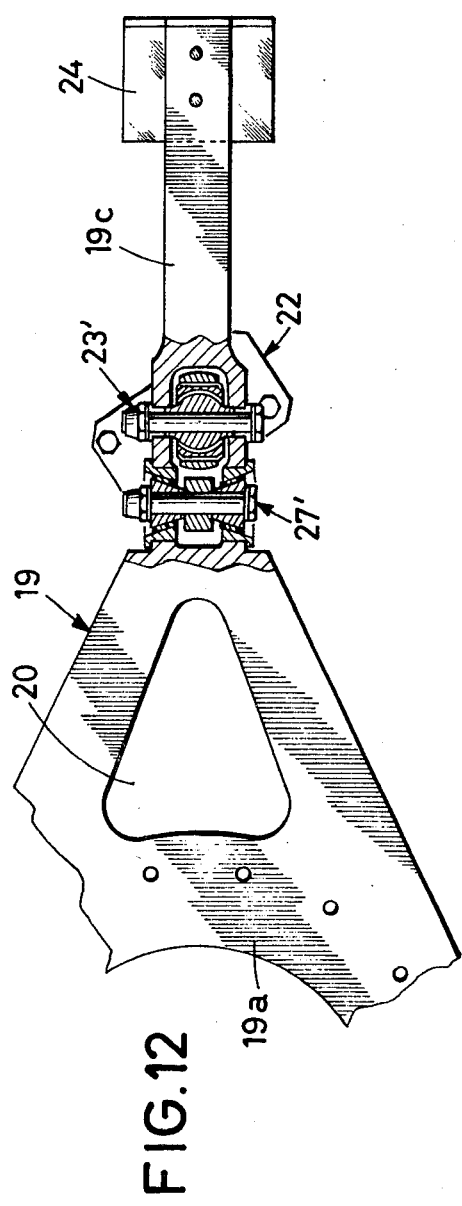
FIG. 12 is a view similar to FIG. 6 showing an interchange in the types of joints employed to secure the flexible arms of the suspension device.
Figure 13:
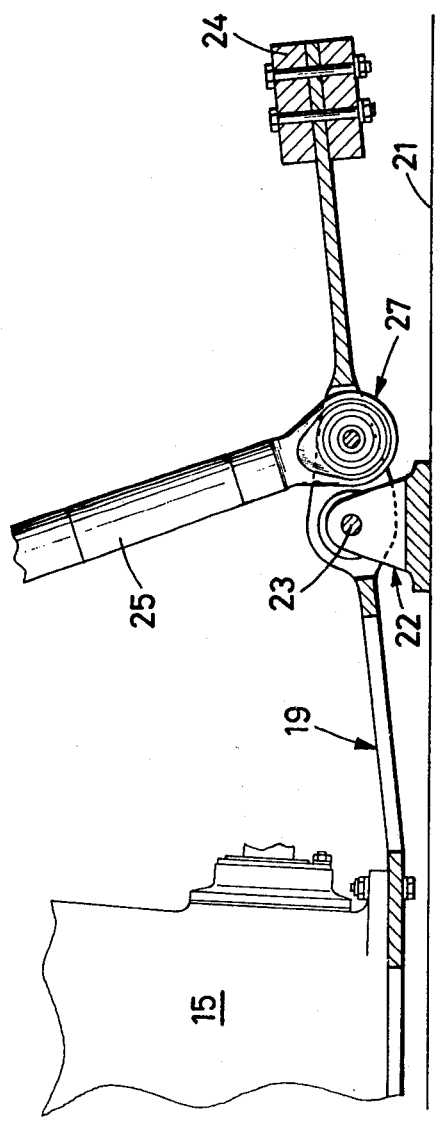
FIG. 13 is a view similar to that of FIG. 5 showing the interchange illustrated in FIG. 12.

FIGS. 12 and 13 show the interchangeability of the types and position of the joints 22 and 27. As seen in FIG. 12, the joint 27' between the oblique bar 25 and the arm 19 is a double conical bearing such as described earlier for joint 22, while the joint 23' between the arm 19 and the fuselage is a ball joint. In FIG. 13 the joint 27 between the oblique bar and the arm 19 is on the exterior of the joint 22.

What is claimed is:

1. An anti-resonant suspension system for supporting the rotor and gear box of a helicopter on the fuselage thereof comprising a mounting plate having a central part on which is secured the bottom of the gear box and a plurality of radially extending flexible arms disposed coplanar uniformly about the central axis of said gear box, said arms being rigid within their plane and flexible in a direction perpendicular thereto, each of said arms being joined at its end to said fuselage, a plurality of oblique connecting bars corresponding in number to the number of said arms, said bars being joined at one end to the upper end of said gear box and at its other end to a respective one of said arms at a point along said arm adjacent to but spaced latterally from the joint between said arms and said fuselage, said respective joints permitting flexing of each of said arms along their length by deformation in a direction perpendicular to the plane of said arms, each of said arms having a lever integral with its outer end and extending freely therefrom in the plane of said arm, said lever having a flapping weight secured to the free end thereof substantially coplanar with said arm.

2. The device of claim 1, wherein the joint by which each flexible arm is connected to the fuselage is a bearing joint whose axis is contained in the plane of the mounting plate and perpendicular to the longitudinal direction of said arm.

3. The device of claim 2, wherein the joint by which each flexible arm is connected to the lower end of the corresponding connecting bar is a ball joint.

4. The device of claim 1, wherein the joint by which each flexible arm is connected to the fuselage is a ball joint.

5. The device of claim 4, wherein the joint by which each flexible arm is connected to the lower end of the corresponding connecting bar is a bearing joint.

6. The device of claim 1, wherein the flexible arms have a width which decreases from the central part of the mounting plate towards their end.

7. The device of claim 1, wherein the flexible arms comprise an inner opening extending along their longitudinal axis.

8. The device of claim 7, wherein the lever bearing the flapping weight of each flexible arm is constituted by an extension of said arm directed towards the inside, the flapping mass being located in the opening of the flexible arm, between the joint on the fuselage and the centre of the plate.

9. The device of claim 1, wherein the lever bearing the flapping weight of each flexible arm is constituted by an extension of said arm directed towards the outside, the flapping weight being located beyond the joint on the fuselage with respect to the centre of the plate.

10. The device of claim 1, wherein the joint connecting each flexible arm to the fuselage is located between the flapping weight and the joint connecting said arm to the corresponding connecting bar.

11. The device of claim 1, wherein the joint connecting each flexible arm to the corresponding connecting bar is located between the flapping weight and the joint connecting said arm to the fuselage.

12. The device of claim 1, wherein the lever bearing each flapping weight is connected to the corresponding flexible arm.

* * * * *